Aug. 15, 1961    H. GOSSEN    2,995,996
AUTOMATIC EXPOSURE CONTROL FOR PHOTOGRAPHIC CAMERAS
Filed Dec. 11, 1957    5 Sheets-Sheet 1

INVENTOR:
HANS GOSSEN

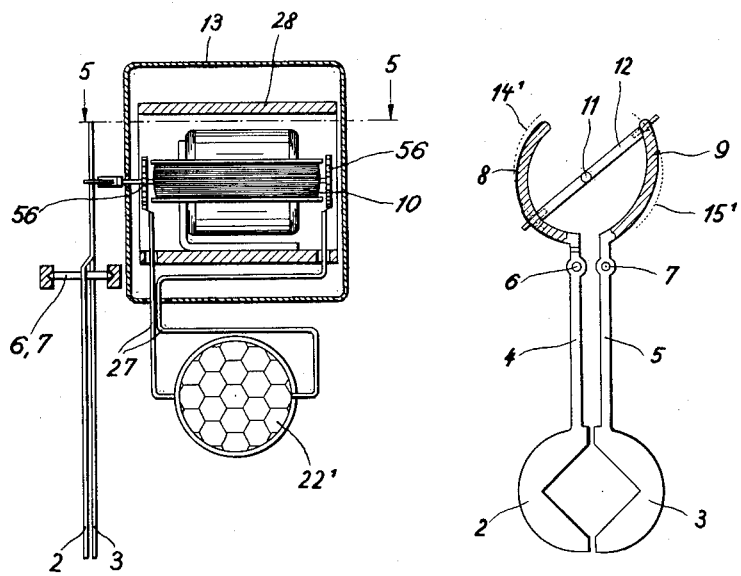
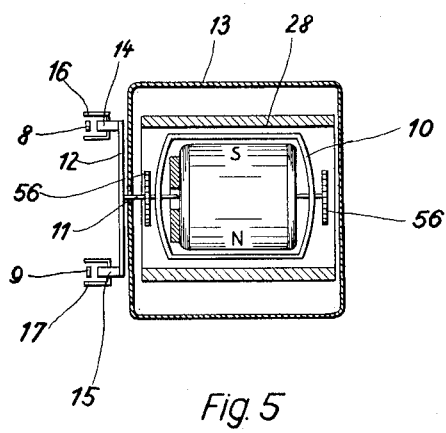

Aug. 15, 1961  H. GOSSEN  2,995,996
AUTOMATIC EXPOSURE CONTROL FOR PHOTOGRAPHIC CAMERAS
Filed Dec. 11, 1957  5 Sheets-Sheet 3

Inventor:
HANS GOSSEN

United States Patent Office 2,995,996
Patented Aug. 15, 1961

2,995,996
AUTOMATIC EXPOSURE CONTROL FOR
PHOTOGRAPHIC CAMERAS
Hans Gossen, Erlangen, Bavaria, Germany, assignor to
P. Gossen & Co. G.m.b.H., Erlangen, Bavaria, Germany
Filed Dec. 11, 1957, Ser. No. 702,195
Claims priority, application Germany Dec. 24, 1956
16 Claims. (Cl. 95—64)

The present invention relates to automatic exposure control for photographic cameras of the type comprising a photoelectric device capable of producing a varying response current in proportion to the brightness of a scene or subject to be photographed, said current serving to operate adjustable exposure control means such as an iris diaphragm in such a manner as to result in a correct exposure for a given scene brightness, and other exposure controlling factors including shutter speed or exposure time and emulsion sensitivity.

Automatic exposure control devices of the above-mentioned type are well known in the art. In the most simple cases these control devices cooperate with diaphragms consisting of one or more suitably shaped leaves which are mounted on one or more instrument hands so that, according to the deflection of the hands, the necessary diaphragm aperture is set.

It is likewise known to provide a camera with an optical lens system in which two or more apertured discs or slides with apertures are provided so that, with the aid of pull cords or similar arrangements, they can be moved relatively to each other in order to produce a diaphragm aperture actually required, whereby movable parts of an indicating instrument or a measuring mechanism serve as drive for effecting the movement of the apertured discs or slides.

However, these constructions, which have become known in many modified forms, have not been introduced in practice because either the quality factor of the indicating or the measuring instruments is reduced to a prohibited extent or because, due to the low torque of all movable parts, the existing movement forces are in no case sufficient to overcome the mechanical resistance in the said constructions.

To eliminate said disadvantages it is, therefore, the object of the present invention to provide an efficient method of automatically setting diaphragm blades in cameras having a photoelectric illumination control including a built-in exposure meter with a photoelectric cell and a measuring mechanism and, separated therefrom, pivoted adjusting elements for the diaphragm blades, and an arrangement for carrying out that method, which method comprises transmitting turning movements of the exposure meter to the adjusting elements for the diaphragm blades through the intermediary of a magnet coupling.

Preferred forms of arrangement for carrying out the method are illustrated by way of example in the drawings in which:

FIG. 3 is an enlarged detail view of essential parts of FIG. 2;

FIG. 4 is a rear view, partly in section, of the diaphragm blades with their pivoted adjusting elements and of a cross bar of the measuring mechanism cooperating therewith;

FIG. 5 is a horizontal section taken on line 5—5 of FIG. 3;

Similar reference numerals refer to similar parts throughout the several figures.

Figure 1:
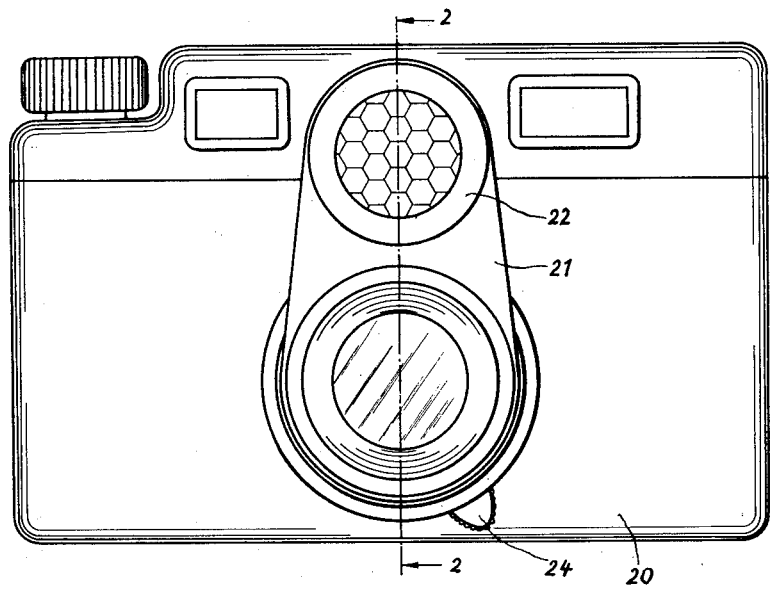
FIG. 1 is a front elevation of a photographic camera with a built-in photoelectric illumination control including a built-in exposure meter with a photoelectric cell and a measuring mechanism and, separated therefrom, pivoted adjusting elements for the diaphragm blades.
Figure 2:
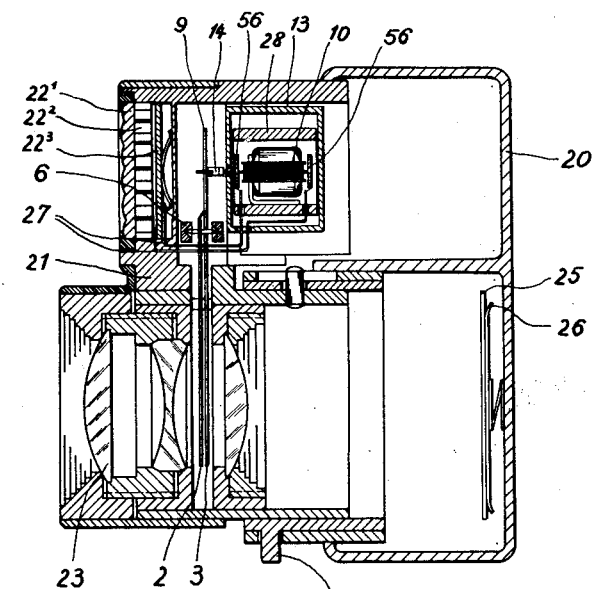
FIG. 2 is a vertical cross section taken on line 2—2 of FIG. 1.

FIGS. 1 and 2 of the drawings show by way of example a photographic camera 20 with curtain shutter. A holder 21 is fitted in the front side of the camera and carries in its upper part a built-in exposure meter 22 and in its lower part an optical lens system 23. The holder 21 can be shifted for range adjustment in known manner by means of a lever 24 through the intermediary of a worm drive not shown. 25 designates a film which is urged in known manner into proper position by a spring-loaded pressure plate 26. The exposure meter 22 comprises a honeycomb lens $22^1$ with measuring angle defining compartments $22^2$ arranged in front of a photoelectric cell $22^3$.

The photoelectric cell $22^3$ is electrically connected by means of wires 27 to a measuring mechanism which will be described later on.

With particular reference to FIGS. 3 and 4, two suitably shaped diaphragm blades 2 and 3 are arranged within the optical lens system of the camera. Each one of said blades 2 and 3 is formed on one of the lower ends of swing arms 4 and 5 which are pivotally mounted at 6 and 7. From the other ends of said swing arms 4 and 5 there extend two curved arms 8 and 9 which consist of ferro-magnetic material.

As is shown in FIG. 5, the curved arms 8 and 9 are positioned adjacent the measuring mechanism of the exposure meter, which in the examples illustrated is a core magnet measuring mechanism. Within a magnetic short circuit ring 28 arranged in a magnetic shielding 13, a rotary coil 10 is rigidly mounted on an axle 11 to which a cross bar 12 of non-magnetic material is secured. The axle 11 extends freely movable through a bore in the magnetic shielding 13. The cross bar 12 carries at its ends rod-shaped permanent magnets 14 and 15 which are spaced only a short distance from the curved arms 8 and 9 so that these arms are always within the magnetic fields of said permanent magnets 14 and 15. In order to prevent the magnetic fields between the curved arms 8 and 9 and the magnets 14, 15 from being impaired or disturbed, abutments 16 and 17 of non-magnetic material are provided at suitable points.

The arrangement described operates in the following manner:

If the photoelectric cell $22^3$ is directed on to a subject to be photographed, the photoelectric current corresponding to the prevailing brightness causes via the wires 27 the rotary coil 10 with its axle 11 and cross bar 12 to turn through a certain angle. During this turning movement, the permanent magnets 14 and 15 move on an arcuate path as indicated in dashed lines at $14^1$ and $15^1$ in FIG. 4. The ferro-magnetic curved arms 8 and 9 which according to FIG. 5 are located with a slight clearance adjacent the permanent magnets 15 and 14 and are suitably shaped and "coupled" by the magnetic fields with the permanent magnets, follow the actual positions of said permanent magnets. This, however, causes the swing arms 4 and 5 to move about their respective pivot points 6 and 7 so that the two diaphragm blades 2 and 3 move accordingly.

In order to illustrate the operation of the device as clear as possible, FIG. 4 shows the cross bar 12 in a position corresponding to a wide open diaphragm, whereas in FIGS. 3 and 5 the cross bar 12 takes a position corresponding to a half closed diaphragm.

The ratio of transmission between the curved arms 8 and 9 and the swing arms 4 and 5 is determined by the smallest or largest diaphragm aperture required and the distance which the two permanent magnets 14 and 15 are apart. According to the dimensions of these structural elements a step-up or step-down ratio may be required.

In FIG. 4 the curved arms 8 and 9 are shown as plain curved members for the sake of clearness. In order to attain the desired effect the curved members in the practical application of the invention are, however, based on calculations and experiments, so shaped that the form thereof complies on the one hand with the scale characteristics of the photoelectric cell and the measuring mechanism and on the other hand with the continually changing ratio of transmission at the point of application between the permanent magnets 14 and 15 and the ferro-magnetic curved arms 8 and 9.

Figure 6:
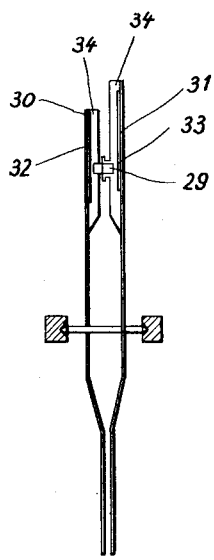
FIG. 6 is a side elevational view, partly in section, of a second form of construction of the diaphragm blades and their adjusting elements.
Figure 7:
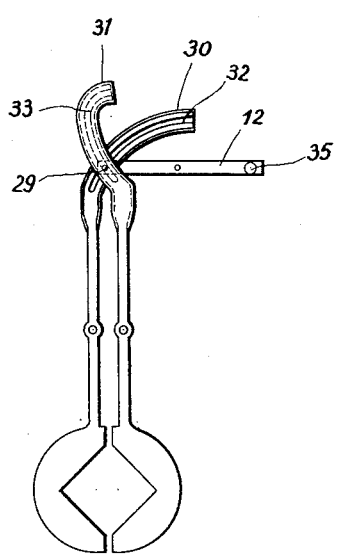
FIG. 7 is a rear view, partly in section, of the blades and the adjusting elements, viewed from the right-hand side of FIG. 6.
Figure 8:
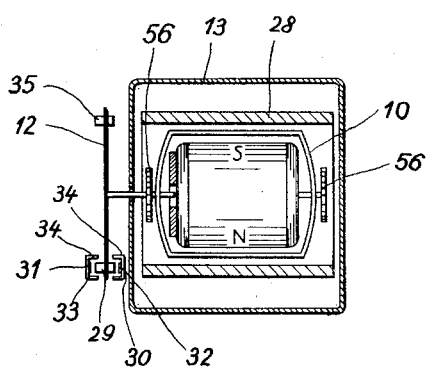
FIG. 8 is a view similar to FIG. 5, but showing the second form of construction of the diaphragm blades and their adjusting elements.

FIGS. 6 to 8 show a modified embodiment of the invention in which, instead of the two magnets 14 and 15, only one magnet 29 is provided on the cross bar 12, at one end thereof. Accordingly, the two curved arms 8 and 9 of FIG. 4 are modified to form differently shaped arms 30 and 31 adjacent either side of the magnet 29. The arms 30 and 31 are made of non-magnetic material and carry, as can be seen in FIG. 8, on their sides facing the magnet 29 iron members 32 and 33, respectively, such as pieces of wire. The arms 30 and 31 have bent up edges, as at 34, to prevent disengagement from the magnet in the event the device is subjected to strong vibrations or shocks. For the sake of stability, a balance weight 35 is mounted on the end of the cross bar 12 remote from the magnet 29.

Figure 9:
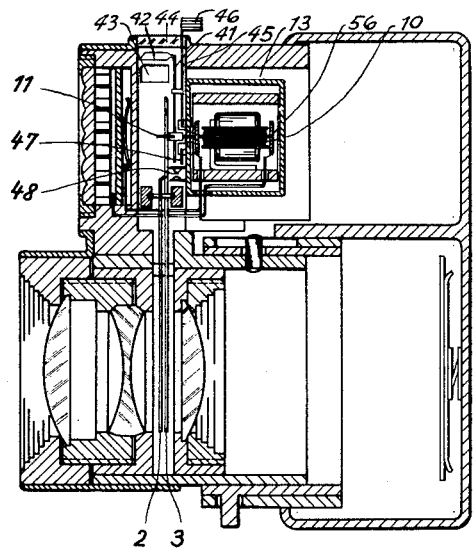
FIG. 9 is a view similar to FIG. 2 but showing the photographic camera equipped with additional means for making visible the operation of the automatic exposure control, for short-circuiting the photoelectric cell and for manual adjustment of the diaphragm blades.
Figures 10, 11:
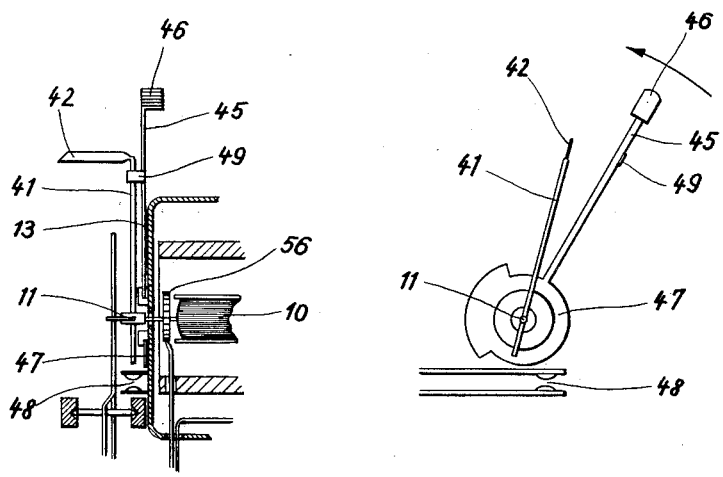
FIG. 10 is an enlarged detail view of essential parts of FIG. 9.
FIG. 11 shows a detail of the means for manual adjustment shown in FIGS. 9 and 10, respectively.

As shown in FIGS. 9, 10 and 11, an indicator member such as a pointer 41 may be mounted on the axle 11 of the measuring mechanism in addition to the cross bar 12 to indicate the operation of the measuring mechanism. This pointer has a bent upper end portion 42 arranged to move over a scale 43 behind an inspection window 44 through which the user of the camera can readily read the diaphragm aperture automatically set.

FIGS. 9, 10 and 11 show also an arrangement that allows manual adjustment of the diaphragm blades while the photoelectric cell is cut off or short circuited. A lever 45 having a handle or knob 46 at one of its ends has a substantially ring-shaped cam disk 47 at its opposite end. A central bore of relatively large diameter is provided in the cam disk 47, in which an annular guide member engages so that the cam disk 47 with its lever 45 can be turned on said annular guide member. This guide member is secured to the magnetic shielding box 13 in such a manner that it surrounds the bore through which the axle 11 freely movable projects. The cam disk 47 cooperates with a pair of normally open contacts 48 suitably incorporated in the circuit of the photoelectric cell.

The lever 45 carries intermediate its ends a tang or lug 49 adapted to engage the pointer 41 on the operation of the lever 45. The arrangement being such that when the lever 45 is moved by hand in the direction of the arrow indicated in FIG. 11, the contacts 48 will be closed first before the lug 49 engages the pointer 41. Closure of contacts 48 effects short-circuiting of the photoelectric cell so that there is no photoelectric current to act on the rotary coil 10 of the measuring mechanism. When continuing turning the lever 45 in the direction of the arrow, the pointer 41 is taken along by the lug 49, causing the rotary coil to rotate accordingly. Thereby, the diaphragm blades 2 and 3 which are urged into wide open position by return springs 56 acting on the rotary coil 10, are moved to close the diaphragm aperture in accordance with the angular position of the manually rotated rotary coil 10.

Figure 12:
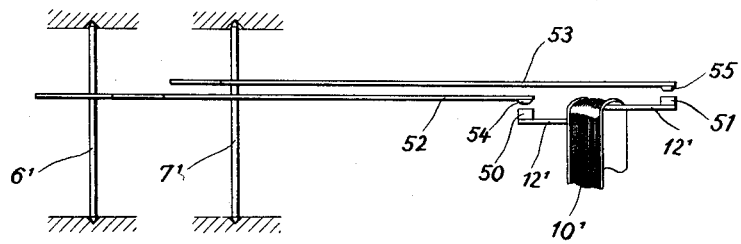
FIG. 12 is a top plan view of a third form of construction of the diaphragm blades and their adjusting elements.
Figure 13:
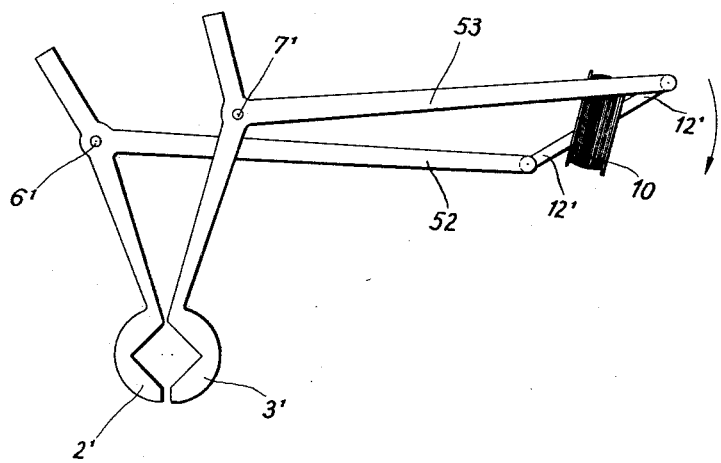
FIG. 13 is an elevational view of FIG. 12, viewed from the top thereof.

Another modification, which has proved most suitable in practice, is diagrammatically illustrated in FIGS. 12 and 13. A rotary coil $10^1$ constructed and arranged similarly to the coil 10 in the previous embodiments, has a transverse member or cross bar $12^1$ carrying at its free ends magnets 50 and 51. For the sake of simplicity, the cross bar $12^1$ is shown as being mounted in direct connection with the rotary coil $10^1$, but in practice the arrangement will be similar to that of the embodiments already described. Two suitably bent swing arms 52 and 53 made of non-magnetic material are pivotally mounted on pivots $6^1$ and $7^1$. Each of said arms 52 and 53 carries at one of its ends a diaphragm blade $2^1$ or $3^1$, respectively, while a small iron member 54 or 55 is rigidly attached to the other end of said arms, respectively. The operation is similar to that described heretofore in connection with the other embodiments.

Of course, various changes may be made in the details disclosed in the foregoing specification without departing from the invention and the claims annexed hereto.

I claim:
1. A device for automatically setting diaphragm blades in cameras, comprising an exposure meter with a photosensitive element, a measuring mechanism conductively connected to said element and composed of stationary and rotatable parts, an adjustable diaphgram blade pivotally mounted adjacent and eccentric with respect to the axis of the rotating part of the measuring mechanism, and a purely magnetic coupling means between a portion of said measuring mechanism and a portion of said adjustable diaphragm blade for converting movement of said portion of said measuring mechanism in a given direction to movement of said portion of said diaphragm blade in a direction transverse to said given direction without any material connection between them.

2. A device as claimed in claim 1, wherein said measuring mechanism includes a rotary coil, a bar rigidly connected to said coil, said bar carrying a permanent magnet, said diaphragm blade having a ferro-magnetic portion located in the range of the magnetic flux of said permanent magnet.

3. A device as claimed in claim 2, including a second adjustable diaphragm blade having a ferro-magnetic portion and wherein the ferro-magnetic portions are elongated and curved and said bar is a cross bar having a permanent magnet adjacent each end arranged so that for all possible positions of the permanent magnets only one part of said ferro-magnetic portions of said diaphgram blades is in the range of substantial magnetic flux while all the other parts of said ferro-magnetic portions of said diaphragm blades are located outside the range of substantial magnetic flux.

4. A device as claimed in claim 2, wherein means are provided for magnetically screening the measuring mechanism.

5. A device as claimed in claim 2, wherein means are provided for magnetically screening parts of the device other than the measuring mechanism.

6. A device for automatically setting the diaphragm opening in a camera having a photosensitive element and electromagnetic means movable in response to actuation of said element, comprising a pair of diaphragm members each including a pivotally mounted arm having a diaphragm blade at one end, the end on the opposite side of the pivot including a portion of ferro-magnetic material, a movable magnet connected to said electromagnetic means and movable thereby, in proportion to light actuation of said photosensitive element, over a path divergent to said arms and within the range of magnetic flux of at least a portion of said magnetic material portions of said arms to pivot said arms and adjust the position of said diaphragms in proportion to the amount of light falling on said photosensitive element.

7. A device according to claim 6, wherein the arms are curved on the opposite side of said pivot from said blades and said magnet is a member mounted for rotation about its central portion to deflect the ferro-magnetic portion of said arms as said magnet is rotated by said photosensitive means.

8. In a camera, an arrangement for automatically setting an exposure aperture in response to light comprising, a photoelectric illumination control including a built-in exposure meter having a photoelectric cell and a measuring mechanism conductively connected to the photoelectric cell for response thereto, a pair of elongated diaphragm blades having cutouts defining the aperture, an adjusting element fixed to at least one of the diaphragm blades, said measuring mechanism including a core magnet, said measuring mechanism comprising a magnetic shielding member, a magnet short circuit ring mounted within said shielding member and around the core magnet, an axle mounted for rotation within said magnetic short circuit ring and extending with at least one end through said magnetic shielding member, a rotary coil rigidly mounted on said axle and adapted to freely rotate therewith between said core magnet and said magnetic short circuit ring, each diaphragm blade being pivoted on an axis parallel to but appreciably spaced from said axle, a cross bar secured on said end of the axle, said cross bar having at at least one of its ends a permanent magnet adapted to move with said cross bar in close proximity to but slightly spaced from the ferro-magnetic portion of each adjusting element.

9. In a photographic camera, a device for automatically setting diaphragm blades in response to the available light comprising, a pair of diaphragm blades having cutouts defining an exposure aperture, a photosensitive element, a galvanic movement electrically connected to said photosensitive element for rotary response thereto, a permanent magnet connected to said galvanic movement for translatory movement of at least one of its poles in a circular path in response to the rotation of said galvanic movement, said magnet being positioned at all times beyond the effective range of the flux field of said galvanic movement; a magnetic cam including an elongated temporarily magnetizable member connected to one of the blades for movement therewith and positioned adjacent an arc of the circular path of the pole of said magnet and mounted for movement transverse to its length in response to the movement of the pole of said magnet, whereby a change in light intensity will cause movement of said magnet and consequent movement of said one blade, the movement of said member being such as to continuously align a portion of said member with the pole of said magnet so that as the magnet passes through a continuous arc the pole will move along the length of the elongated member, the width of said member approximating the size of the pole of said magnet, the shape of said elongated member being predetermined so as to regulate its displacement.

10. In a photographic camera, a device for automatically setting diaphragm blades in response to the available light comprising, a pair of diaphragm blades having cutouts defining an exposure aperture, a photosensitive element, a galvanic movement electrically connected to said photosensitive element for rotary response thereto, a permanent magnet mounted for translatory movement in a circular path in response to the rotation of said galvanic movement, said magnet being positioned at all times beyond the effective range of the flux field of said galvanic movement, said magnet further being of a mass insufficient to noticeably retard rotary movement of said galvanic movement, an actuating arm connected to at least one of the diaphragm blades of the camera; a magnetic cam for movement of said blades including an elongated temporarily magnetizable member connected to one of the blades for movement therewith, said member being positioned adjacent and skewed with respect to an arc of the circular path of the pole of said magnet and mounted for responding to the pole of said magnet without touching said magnet by movement of said member transverse to its length, whereby as said magnet moves in its circular path and said element moves so that the closest portion of said element is in the closest possible position to said magnet the magnet will traverse the length of said member, whereby a change in light intensity will cause movement of said magnet and consequent movement of the blades, the width of said member being similar to the dimension of the pole of said magnet, the shape of said elongated member being predetermined to regulate its displacement.

11. In a photographic camera, a device for automatically setting diaphragm blades in response to the available light comprising, a pair of diaphragm blades having cutouts defining an exposure aperture, a photosensitive element, a galvanic movement electrically connected for rotatably responding to said photosensitive element, an axle keyed to said galvanic movement, a diametrically extending member secured to said axle for rotation therewith, a pair of permanent magnets each mounted on one side of said axle at equal radial distances from said axle, said magnets being mounted for movement in a circular path in response to the rotation of said galvanic movement, means for shielding said magnets from the magnetic flux of said galvanic movement, a pair of pivotally mounted actuating arms each connected to one of the diaphragm blades, a magnetic cam for movement of said actuating arms including a pair of elongated temporarily magnetizable members each connected to one of the actuating arms for movement therewith, the width of each of said elements being approximately coextensive with said magnets, each of said members being adjacent the arc of the circular path of one of said magnets but skewed thereto for responding by transverse movement of the members to the arcuate movement of the adjacent ones of said magnets, whereby circular movement of said magnets produces pivotal movement of said actuating arms and said blades, the shape of said elongated members being predetermined so that the movement of the blades in response to the movement of said magnets in a circular path causes exact correspondence of the required aperture to the intensity of the available light.

12. In a photographic camera, a device for automatically setting diaphragm blades in response to the available light comprising, a pair of diaphragm blades having cutouts defining an exposure aperture, a photosensitive element, a galvanic movement electrically connected to and rotatably responsive to said photosensitive element, an axle movably mounted for rotation with said galvanic movement, a radially extensive support member mounted for movement with said axle, a permanent magnet mounted on said support member for translatory movement along a circular path in response to the rotation of said galvanic movement, means for shielding said magnet from the flux field of said galvanic movement, a pivotally mounted actuating arm connected to at least one of the blades; a magnetic cam including an elongated temporarily magnetizable member connected to the actuating arm for movement therewith, said magnetizable member being positioned askew to but in near alignment with an arc of the circular path of the poles of said magnet and being mounted for responding by movement of said magnetizable member transverse to its length to the circular movement of said magnet, whereby pivotal movement of said actuating arm results, the width of said magnetizable member being similar to the width of said magnet, the shape of said elongated magnetizable member being predetermined so as to regulate its displacement by said magnet.

13. In a photographic camera, a device for automatically setting a pair of diaphragm blades in response to the available light comprising, a pair of diaphragm blades defining an exposure aperture, a photosensitive element, a galvanic movement electrically connected and rotatably responsive to said photosensitive element, an axle extending from said photosensitive element and rotatable therewith, a transverse support member capably mounted for movement with said axle, a permanent magnet mounted on said support member for translatory movement in a circular path in response to the rotation of said galvanic movement, a pair of pivotally mounted actuating arms connected to the pair of diaphragm blades; a magnetic cam arrangement including a pair of elongated temporarily magnetizable members each connected to one of said actuating arms for movement therewith and positioned in different but closely spaced planes, said magnet moving in a plane between the planes of said elongated elements, said elongated elements each being adjacent and skewed relative to the arc of the circular path of said magnet for movement of each of the elements transverse to its length in response to the arcuate movement of said magnet whereby each of the actuating arms is pivotally moved and each of said blades is moved with respect to the other, the width of said magnetizable members being similar to the dimensions of said magnet, the shape of said elongated members being predetermined so that movement of the blades in response to the movement of the magnet in a circular path causes correspondence of the required aperture size to the intensity of the available light.

14. An arrangement as claimed in claim 8, wherein indicator means are provided for visual indication of the turning movements of the measuring mechanism.

15. An arrangement as claimed in claim 8, wherein means are provided for selective manual setting of the diaphragm blades in cooperation with indicator means arranged for visual indication of the operation of the measuring mechanism.

16. An arrangement as claimed in claim 8, wherein means are provided for selective manual setting of the diaphragm blades.

References Cited in the file of this patent

UNITED STATES PATENTS

| | | |
|---|---|---|
| 1,813,635 | Myers et al. | July 7, 1931 |
| 2,013,362 | Riszdorfer | Sept. 3, 1935 |
| 2,100,672 | Riszdorfer | Nov. 30, 1937 |
| 2,206,086 | Gaylon | July 2, 1940 |
| 2,449,283 | Dike et al. | Sept. 14, 1948 |
| 2,841,064 | Bagby et al. | July 1, 1958 |